(12) United States Patent
Someya et al.

(10) Patent No.: US 10,363,963 B2
(45) Date of Patent: Jul. 30, 2019

(54) FLOOR BRACE FASTENING STRUCTURE

(71) Applicant: TOYOTA JIDOSHA KABUSHIKI KAISHA, Toyota-shi (JP)

(72) Inventors: Kenichi Someya, Nisshin (JP); Chiaki Iitaka, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 28 days.

(21) Appl. No.: 15/846,359

(22) Filed: Dec. 19, 2017

(65) Prior Publication Data

US 2018/0194397 A1 Jul. 12, 2018

(30) Foreign Application Priority Data

Jan. 6, 2017 (JP) .................................. 2017-001374

(51) Int. Cl.
    *B62D 21/15* (2006.01)
    *B62D 27/06* (2006.01)
    *B62D 25/14* (2006.01)

(52) U.S. Cl.
    CPC ........... *B62D 21/15* (2013.01); *B62D 25/145* (2013.01); *B62D 27/065* (2013.01)

(58) Field of Classification Search
    CPC ..... B62D 27/065; B62D 21/15; B62D 25/145
    USPC .............................................. 296/70, 193.02
    See application file for complete search history.

(56) References Cited

U.S. PATENT DOCUMENTS

| 6,409,590 B1* | 6/2002 | Suzuki ................. B60H 1/0055 454/143 |
| 9,428,088 B1* | 8/2016 | Rajasingham ......... B60N 2/427 |
| 2011/0095570 A1* | 4/2011 | Durocher ............. B62D 25/145 296/193.02 |
| 2015/0151793 A1* | 6/2015 | Appasamy ........... B62D 25/145 296/72 |
| 2015/0298720 A1* | 10/2015 | Nakane ................... B62D 1/16 280/779 |

FOREIGN PATENT DOCUMENTS

| JP | 2006-264444 | 10/2006 |
| JP | 2009-274654 | 11/2009 |

* cited by examiner

*Primary Examiner* — Pinel E Romain

(74) *Attorney, Agent, or Firm* — Oblon, McClelland, Maier & Neustadt, L.L.P.

(57) ABSTRACT

A floor brace fastening structure includes: a floor brace that is configured to extend toward a vehicle lower side from an instrument panel reinforcement provided at a front portion of a passenger compartment; a vehicle floor to which the floor brace is fastened using a fastener; and a reinforcing member that is formed of a material with a higher coefficient of extension than a material that forms the floor brace, the reinforcing member being attached to the floor brace and being fastened to the vehicle floor using the fastener.

4 Claims, 3 Drawing Sheets

FLOOR BRACE FASTENING STRUCTURE

CROSS-REFERENCE TO RELATED APPLICATION

This application is based on and claims priority under 35 USC 119 from Japanese Patent Application No. 2017-001374 filed on Jan. 6, 2017, the disclosure of which is incorporated by reference herein.

BACKGROUND

Technical Field

The present disclosure relates to a fastening structure that fastens a floor brace to a vehicle floor, which floor brace joins an instrument panel reinforcement to the vehicle floor.

Related Art

Japanese Patent Application Laid-Open (JP-A) No. 2006-264444 describes a steering support beam (an instrument panel reinforcement), in which a first support beam disposed at a driver seat side and a second support beam disposed at a passenger seat side are joined and fixed via a joining member. A long, narrow center stay (a floor brace) integrally extends toward the vehicle lower side from a lower portion of the joining member. The lower end of the floor brace is fixed to a passenger compartment floor portion (a vehicle floor). Thus, the instrument panel reinforcement and the vehicle floor are joined via the floor brace.

The floor brace described above may be fabricated by casting. A floor brace fabricated by casting may be fastened to the vehicle floor using, for example, a bolt and nut. However, stresses during a frontal collision of the vehicle may concentrate at this fastening portion. In this situation, if the floor brace fabricated by casting, which has a low coefficient of extension, breaks, the joined state of the floor brace to the vehicle floor is disengaged. As a result, relative displacement of the floor brace relative to the vehicle floor is not restricted, which is not preferable in regard to assuring the safety of vehicle occupants. Accordingly, in cases in which there is concern about a breakage as described above, for example, the cross-sectional shape of the floor brace is enlarged to raise the strength of the floor brace. However, enlarging the cross-sectional shape of the floor brace increases the size of the floor brace and it may be difficult to assure gaps between the floor brace and nearby components (a console side panel and so forth).

SUMMARY

In consideration of the circumstances described above, the present disclosure provides a floor brace fastening structure that, even if the floor brace is formed of a material with a low coefficient of extension, may, while avoiding an increase in size of the floor brace, prevent or suppress disengagement of a joined state between the floor brace and a vehicle floor during a frontal collision.

One aspect of the present disclosure is a floor brace fastening structure including: a floor brace that is configured to extend toward a vehicle lower side from an instrument panel reinforcement provided at a front portion of a passenger compartment; a vehicle floor to which the floor brace is fastened using a fastener; and a reinforcing member that is formed of a material with a higher coefficient of extension than a material that forms the floor brace, the reinforcing member being attached to the floor brace and being fastened to the vehicle floor using the fastener.

According to the aspect described above, the floor brace extending toward the vehicle lower side from the instrument panel reinforcement of the vehicle is fastened to the vehicle floor using the fastener. The reinforcing member is attached to the floor brace. The reinforcing member is formed of the material with a higher coefficient of extension than the material constituting the floor brace and is fastened to the vehicle floor using the above-mentioned fastener. Therefore, even if stresses concentrate at the fastening portion of the floor brace with the vehicle floor during a frontal collision of the vehicle, because the fastening portion is reinforced by the reinforcing member, the fastening portion is resistant to breakage.

Furthermore, even if the floor brace is broken at the fastening portion, the joined state of the floor brace with the vehicle floor via the reinforcing member formed of the material with a high coefficient of extension may be maintained. Therefore, in the present disclosure, even if the floor brace is formed of a material with a low coefficient of extension, disengagement of the joined state between the floor brace and the vehicle floor during a frontal collision may be prevented or suppressed. In addition, because there is no need to enlarge the cross-sectional shape of the floor brace, an increase in size of the floor brace may be avoided.

The present aspect may further include another fastener that fastens the floor brace to the reinforcing member at a different location from the fastener.

In the structure described above, the floor brace and the reinforcing member are fastened together by the another fastener at the different location from the fastener that fastens the floor brace and the reinforcing member to the vehicle floor. Therefore, because the reinforcing member is firmly attached to the floor brace, the joined state of the floor brace to the vehicle floor via the reinforcing member is resistant to disengagement at the above-mentioned time of breakage of the floor brace.

In the present aspect, the reinforcing member may be embedded in the floor brace.

In the structure described above, the reinforcing member is firmly attached to the floor brace by being embedded in the floor brace. Therefore, the joined state of the floor brace to the vehicle floor via the reinforcing member is more resistant to disengagement at the above-mentioned time of breakage of the floor brace.

In the present aspect, a penetrating hole may be formed in the reinforcing member, and the penetrating hole may be filled with the material that forms the floor brace.

In the structure described above, the penetrating hole is formed in the reinforcing member that is embedded in the floor brace, and the penetrating hole is filled with the material that forms the floor brace. Therefore, because the reinforcing member is even more firmly attached to the floor brace, the joined state of the floor brace to the vehicle floor via the reinforcing member is even more resistant to disengagement at the above-mentioned time of breakage of the floor brace.

As described above, with the floor brace fastening structure according to the present disclosure, even if the floor brace is formed of a material with a low coefficient of extension, disengagement of a joined state between the floor brace and the vehicle floor during a frontal collision may be prevented or suppressed, while an increase in size of the floor brace may be avoided.

BRIEF DESCRIPTION OF THE DRAWINGS

An exemplary embodiment of the present disclosure will be described in detail based on the following figures, wherein.

DETAILED DESCRIPTION

First Exemplary Embodiment

Figure 1:
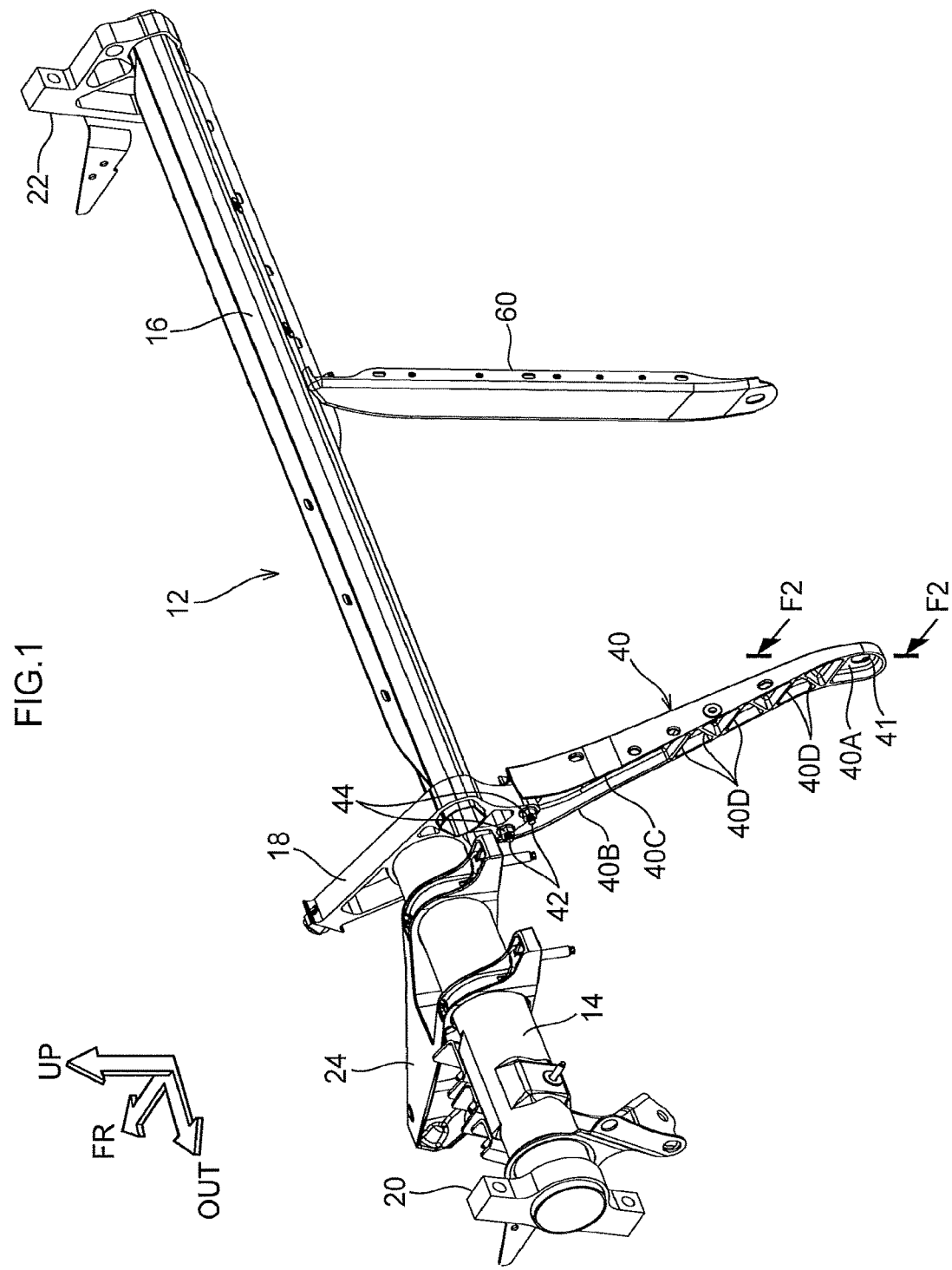
FIG. 1 is a perspective diagram illustrating structures of related members, including a floor brace, which are included in a floor brace fastening structure according to a first exemplary embodiment.

A floor brace fastening structure 10 according to a first exemplary embodiment is described with reference to FIG. 1 and FIG. 2. An arrow FR, an arrow UP and an arrow OUT that are illustrated in the drawings indicate, respectively, a forward direction (a progress direction) of a vehicle, an upward direction, and outward in a width direction. Herebelow, where descriptions are given simply using the directions front and rear, left and right, and up and down, unless specifically stated otherwise, these indicate front and rear in the vehicle front-and-rear direction, left and right in the vehicle left-and-right direction (the vehicle width direction), and up and down in the vehicle vertical direction.

Structure

Figure 2:
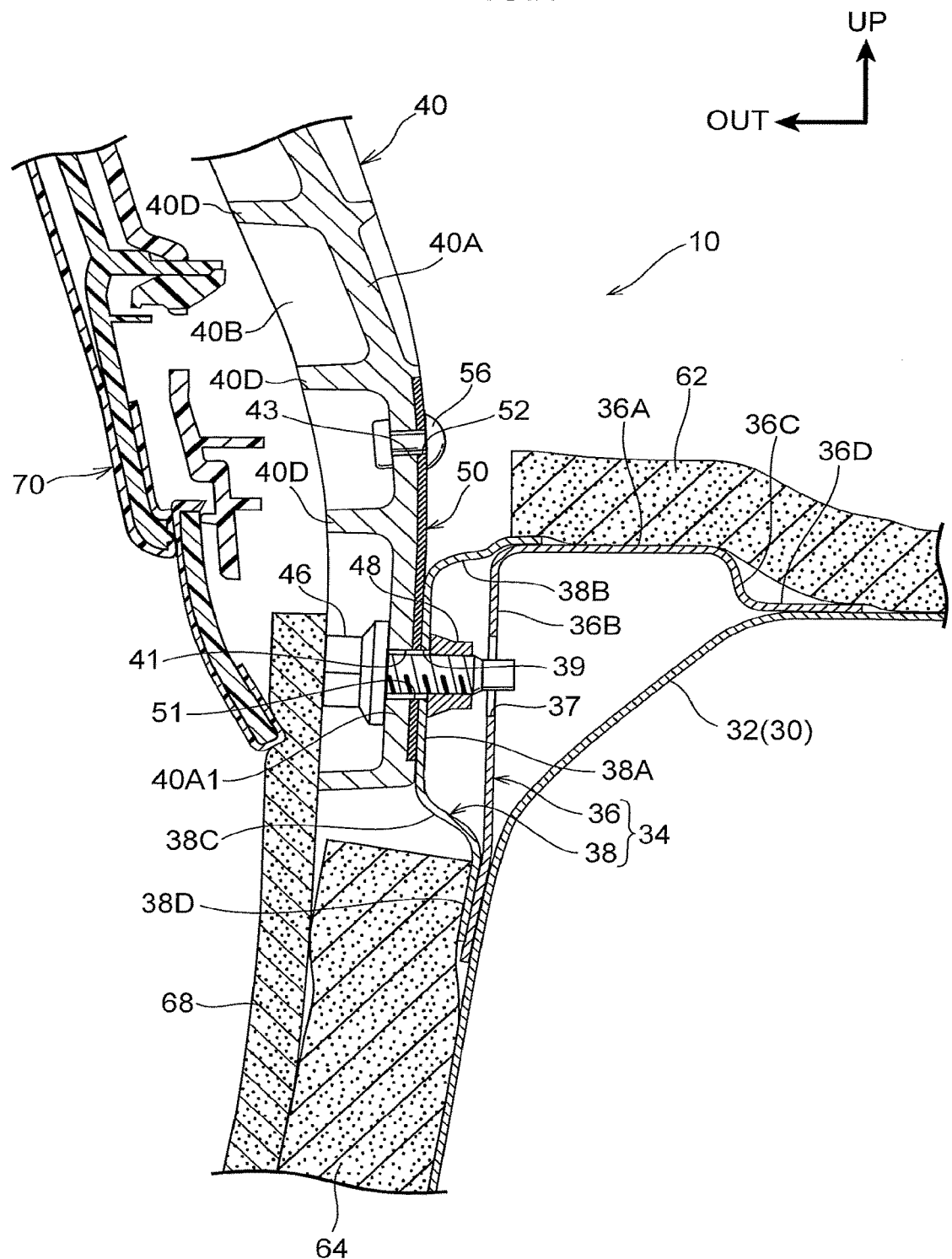
FIG. 2 is a sectional diagram, corresponding to line F2-F2 in FIG. 1, illustrating structures of principal portions of the floor brace fastening structure according to the first exemplary embodiment.

As illustrated in FIG. 1 and FIG. 2, the floor brace fastening structure 10 according to the present exemplary embodiment is provided with a driver seat side floor brace 40 and a vehicle floor 30. The driver seat side floor brace 40 extends toward the vehicle lower side from an instrument panel reinforcement 12 provided at a front portion of a passenger compartment. The driver seat side floor brace 40 is fastened (i.e., "fixed by fastening") to the vehicle floor 30 using a bolt 46 and nut 48. The floor brace fastening structure 10 is also provided with a reinforcing plate 50 and a rivet 56. The reinforcing plate 50 is formed of a material with a higher coefficient of extension than a material that forms the driver seat side floor brace 40. The reinforcing plate 50 is attached to the driver seat side floor brace 40 and is fastened to the vehicle floor 30 using the above-mentioned bolt 46 and nut 48. The rivet 56 fastens the driver seat side floor brace 40 to the reinforcing plate 50 at a different location from the bolt 46 and nut 48.

The driver seat side floor brace 40 described above corresponds to the "floor brace" of the present disclosure, the bolt 46 and nut 48 described above correspond to the "fastener" of the present disclosure, the reinforcing plate 50 described above corresponds to the "reinforcing member" of the present disclosure, and the rivet 56 described above corresponds to the "another fastener" of the present disclosure. FIG. 1 also illustrates a passenger seat side floor brace 60 that joins the instrument panel reinforcement 12 with the vehicle floor 30 at the passenger seat side of the front portion of the passenger compartment. FIG. 2 illustrates soundproofing materials 62 and 64, a floor carpet 68, and a console side panel 70 provided at a center console. The floor brace fastening structure 10 according to the present exemplary embodiment is employed in a left-hand drive vehicle (an automobile), but may be employed in a right-hand drive vehicle, in which case the structures have left-to-right symmetry with the present exemplary embodiment. Below, structures of the floor brace fastening structure 10 are described in detail.

Structure of the Instrument Panel Reinforcement 12

The instrument panel reinforcement 12 is formed in a long, narrow shape that is long in the vehicle width direction. The instrument panel reinforcement 12 is disposed at the vehicle rear side of a dash panel, not illustrated in the drawings, which is provided at a front end portion of the passenger compartment. The instrument panel reinforcement 12 spans between left and right front pillars, which are not illustrated in the drawings. The instrument panel reinforcement 12 includes a large diameter beam 14 and a small diameter beam 16. The large diameter beam 14 structures a portion at the driver seat side of the instrument panel reinforcement 12, and the small diameter beam 16 structures a portion at the passenger seat side and the vehicle width direction center side of the instrument panel reinforcement 12. The large diameter beam 14 and the small diameter beam 16 are formed in pipe shapes of, for example, a metal material. The large diameter beam 14 at the driver seat side requires a relatively large strength. Therefore, the large diameter beam 14 is formed with a larger diameter than the small diameter beam 16, which does not require such a large strength.

The instrument panel reinforcement 12 includes a joining member 18, left and right fixing brackets 20 and 22, and a column bracket 24 (a steering support bracket). The joining member 18 joins the large diameter beam 14 and the small diameter beam 16 to one another. The fixing brackets 20 and 22 fix the large diameter beam 14 and small diameter beam 16 to, respectively, the left and right front pillars. The column bracket 24 is fixed to the large diameter beam 14. The joining member 18, fixing brackets 20 and 22, and column bracket 24 are, for example, castings of lightweight metal. Respective front end portions of the joining member 18 and the column bracket 24 are joined to a cowl, not illustrated in the drawings, which is attached to upper end portions of the dash panel.

Structure of the Vehicle Floor 30

The vehicle floor 30 is formed by, for example, press-forming of steel plate, and structures a floor portion of the passenger compartment. A floor panel 32 that bulges toward the vehicle upper side extends in the vehicle front-and-rear direction at a vehicle width direction central portion of the vehicle floor 30. A floor bracket 34 is provided at a side portion, at the driver seat side, of an upper end portion of the floor panel 32. A lower end portion of the driver seat side floor brace 40 is fastened to the floor bracket 34. The floor bracket 34 is structured by a first bracket 36 and a second bracket 38 that are formed by, for example, press-forming of steel plate.

The first bracket 36 includes an upper wall portion 36A, an outer wall portion 36B, an inner wall portion 36C and an inner flange portion 36D. Viewed in the vehicle front-and-rear direction, the upper wall portion 36A extends in the vehicle width direction. The outer wall portion 36B extends toward the vehicle lower side from a vehicle width direction outer side end portion of the upper wall portion 36A. The inner wall portion 36C extends toward the vehicle lower side from a vehicle width direction center side end portion of the upper wall portion 36A. The inner flange portion 36D extends toward the vehicle width direction center side from a lower end portion of the inner wall portion 36C. A lower end portion of the outer wall portion 36B and the inner flange portion 36D are joined to the floor panel 32 by means such as welding or the like.

The second bracket 38 includes a side wall portion 38A, an upper wall portion 38B, a lower wall portion 38C and a lower side flange portion 38D. Viewed in the vehicle front-and-rear direction, the side wall portion 38A extends in the vehicle vertical direction. The upper wall portion 38B extends toward the vehicle width direction center side from an upper end portion of the side wall portion 38A. The lower wall portion 38C extends toward the vehicle width direction center side from a lower end portion of the side wall portion 38A. The lower side flange portion 38D extends toward the vehicle lower side from a vehicle width direction center side end portion of the lower wall portion 38C. The lower side flange portion 38D is joined to the lower end portion of the outer wall portion 36B of the first bracket 36 and to the floor panel 32 by means such as welding or the like. A vehicle width direction center side end portion of the upper wall portion 38B is joined to the upper wall portion 36A of the first bracket 36 by means such as welding or the like.

Structure of the Driver Seat Side Floor Brace 40

The driver seat side floor brace 40 (below referred to as "the floor brace 40") extends toward the vehicle lower side from a rear end lower portion of the joining member 18 of the instrument panel reinforcement 12. The floor brace 40 is, for example, a casting of a lightweight metal (in this exemplary embodiment, aluminium or magnesium), and is formed in a long, narrow shape that is long in the vehicle vertical direction. The term "aluminium" used here is intended to refer to aluminium or an alloy thereof, and the term "magnesium" used here is intended to refer to magnesium or an alloy thereof. The material of the floor brace 40 is not limited to a lightweight metal but may be a fiber-reinforced plastic or the like.

The floor brace 40 includes a side wall portion 40A, a front wall portion 40B and a rear wall portion 40C. The side wall portion 40A extends in the vehicle vertical direction with a thickness direction in the vehicle width direction. The front wall portion 40B and rear wall portion 40C extend towards the vehicle width direction outer side from both of vehicle front-and-rear direction end portions of the side wall portion 40A. Thus, viewed in the vehicle vertical direction, the floor brace 40 forms a substantial "U" shape in cross section, of which the vehicle width direction outer side is open. The front wall portion 40B and the rear wall portion 40C are linked together at the lower end of the floor brace 40. The floor brace 40 further includes, between the front wall portion 40B and the rear wall portion 40C, plural ribs 40D arrayed in a zig-zag pattern in the vehicle vertical direction. The plural ribs 40D extend towards the vehicle width direction outer side from the side wall portion 40A and link the front wall portion 40B with the rear wall portion 40C in the vehicle front-and-rear direction.

An upper end portion of the side wall portion 40A is fastened to the rear end lower portion of the joining member 18 using front and rear pairs of bolts 42 and nuts 44, which are illustrated in FIG. 1. As illustrated in FIG. 2, a lower end portion of the side wall portion 40A overlaps with the side wall portion 38A of the second bracket 38 at the vehicle width direction outer side thereof. A penetrating hole 41 through which the bolt 46 penetrates is formed in the lower end portion of the side wall portion 40A. The bolt 46 penetrating through the penetrating hole 41 also penetrates through a penetrating hole 51 formed in the reinforcing plate 50, which is described below, and a penetrating hole 39 formed in the side wall portion 38A of the second bracket 38. The bolt 46 is further screwed into the nut 48 (in this exemplary embodiment, a weld nut), which is attached to the vehicle width direction center side face of the side wall portion 38A. Thus, the lower end portion of the floor brace 40 is fastened to the second bracket 38 (the vehicle floor 30) using the bolt 46 and nut 48, and the floor brace 40 spans between the rear end lower portion of the joining member 18 and the vehicle floor 30. A penetrating hole 37 is formed in the outer wall portion 36B of the first bracket 36. A distal end portion of the bolt 46 enters into the penetrating hole 37. FIG. 2 illustrates a fastening portion 40A1 of the floor brace 40 with the vehicle floor 30.

Structure of the Reinforcing Plate 50

The reinforcing plate 50 (the "reinforcing member" or a "protective member") is attached to the vehicle width direction center side relative to the lower end portion of the side wall portion 40A of the floor brace 40. The reinforcing plate 50 is formed of a material (in this exemplary embodiment, steel plate) with a higher coefficient of extension than the material constituting the floor brace 40 (in this exemplary embodiment, a casting of aluminium or magnesium). The term "coefficient of extension" used here is intended to include a meaning equivalent to "elongation". The material of the reinforcing plate 50 is not limited to steel plate but may be iron plate, stainless steel plate or the like.

The reinforcing plate 50 is formed in a plate shape with a long, narrow rectangular shape. The reinforcing plate 50 is disposed in an attitude with its length in the vehicle vertical direction and the plate thickness direction in the vehicle width direction. The reinforcing plate 50 is attached to the lower end portion of the side wall portion 40A by, for example, insert-casting. The reinforcing plate 50 is embedded in the lower end portion of the side wall portion 40A in a state in which a face at the vehicle width direction center side of the reinforcing plate 50 is exposed to the outer side (i.e., to the vehicle width direction center side) of the side wall portion 40A. A structure is possible in which the reinforcing plate 50 is disposed at the vehicle width direction outer side relative to the side wall portion 40A.

A lower portion of the reinforcing plate 50 is sandwiched between the lower end portion of the side wall portion 40A of the floor brace 40 and the side wall portion 38A of the second bracket 38. The penetrating hole 51 through which the above-described bolt 46 penetrates is formed in the lower portion of the reinforcing plate 50. Thus, the lower portion of the reinforcing plate 50 is fastened to the second bracket 38 (the vehicle floor 30) using the bolt 46 and nut 48.

An upper portion of the reinforcing plate 50 is disposed slightly to the vehicle upper side relative to the floor bracket 34. A penetrating hole 52 is formed in the upper portion of the reinforcing plate 50. The penetrating hole 52 corresponds with a penetrating hole 43 formed in the side wall portion 40A of the floor brace 40. The rivet 56 penetrates through the penetrating holes 52 and 43, and the upper portion of the reinforcing plate 50 is fastened to the side wall portion 40A by the rivet 56. The rivet 56 fastens the reinforcing plate 50 to the floor brace 40 at a different location from the bolt 46 and nut 48. The "another fastener" of the present disclosure is not limited to the rivet 56 but may be a nut and bolt, or a screw or the like.

In the floor brace fastening structure 10 with the structure described above, as illustrated in FIG. 2, the lower end portion of the floor brace 40 is covered from the vehicle width direction outer side thereof by a lower end portion of the console side panel 70, and an edge portion of the floor carpet 68 is sandwiched between the lower end portion of the console side panel 70 and the lower end portion of the floor brace 40.

Operation and Effects

Now, operation and effects of the first exemplary embodiment are described.

In the floor brace fastening structure 10 with the structure described above, the lower end portion of the floor brace 40 extending toward the vehicle lower side from the instrument panel reinforcement 12 is fastened to the vehicle floor 30 using the bolt 46 and nut 48, and the reinforcing plate 50 is attached to the lower end portion of the floor brace 40. The reinforcing plate 50 is formed of the material with a higher coefficient of extension (in this exemplary embodiment, steel plate) than the material constituting the floor brace 40 (in this exemplary embodiment, a casting of aluminium or magnesium). The reinforcing plate 50 is joined to the vehicle floor 30 using the bolt 46 and nut 48. Therefore, even if stresses concentrate at the fastening portion 40A1 of the lower end portion of the floor brace 40 with the vehicle floor 30 during a frontal collision of the vehicle, because the fastening portion 40A1 of the floor brace 40 is reinforced by the reinforcing plate 50, the floor brace 40 is resistant to failure (breakage) at the fastening portion 40A1. Further, even if the floor brace 40 breaks at the fastening portion 40A1, the joined state of the floor brace 40 with the vehicle floor 30 via the reinforcing plate 50 may be maintained.

Thus, in the present exemplary embodiment, even though the floor brace 40 is a structure that is fabricated by casting, the joining strength between the floor brace 40 and the vehicle floor 30 may be assured by the reinforcing plate 50 that is fabricated of steel plate. Therefore, a disengagement of the joined state between the floor brace 40 and the vehicle floor 30 during a frontal collision of the vehicle may be prevented or suppressed. In addition, because there is no need to enlarge the cross-sectional shape of the floor brace 40, an increase in size of the floor brace (that is, an increase in space required for the floor brace 40) may be avoided. Therefore, it is easier to assure gaps between the floor brace 40 and components nearby the floor brace 40 (the console side panel 70 and such), and it is easier to assure ease of assembly when the nearby components are being assembled to the vehicle. Furthermore, it is easier to prevent noises being caused by unintended interference between the nearby components and the floor brace 40 during vehicle running.

Because the present exemplary embodiment has a structure in which the reinforcing plate 50 that is fabricated of steel plate is attached to the floor brace 40 that is a casting of a lightweight metal only at a location at which stresses concentrate during a frontal collision and nearby portions, the reinforcing plate 50 may be made small. Because, moreover, there is no need to enlarge the cross-sectional shape of the floor brace 40, an increase in weight of the floor brace 40 incorporating the reinforcing plate 50 may be prevented or suppressed, which may contribute to improvements in running performance and fuel consumption of the vehicle. Because the floor brace 40 is a casting with a high degree of freedom in specification of the shape, the floor brace 40 may achieve both greater assurance of strength and smaller size than in a case in which a floor brace is a press-formed item or the like.

In the present exemplary embodiment, the floor brace 40 and reinforcing plate 50 are fastened together by the rivet 56 at the location that is different from the bolt 46 and nut 48 that fasten the floor brace 40 and reinforcing plate 50 to the vehicle floor 30. Therefore, the reinforcing plate 50 is firmly attached to the floor brace 40, and the joining strength of the floor brace 40 with the vehicle floor 30 via the reinforcing plate 50 may be raised. As a result, the joined state of the floor brace 40 to the vehicle floor 30 via the reinforcing plate 50 is resistant to disengagement at the above-mentioned time of failure of the floor brace 40.

Second Exemplary Embodiment

Now, a second exemplary embodiment is described. Structures and operations that are basically similar to the first exemplary embodiment are assigned the same reference numerals as in the first exemplary embodiment and are not described.

Figure 3:
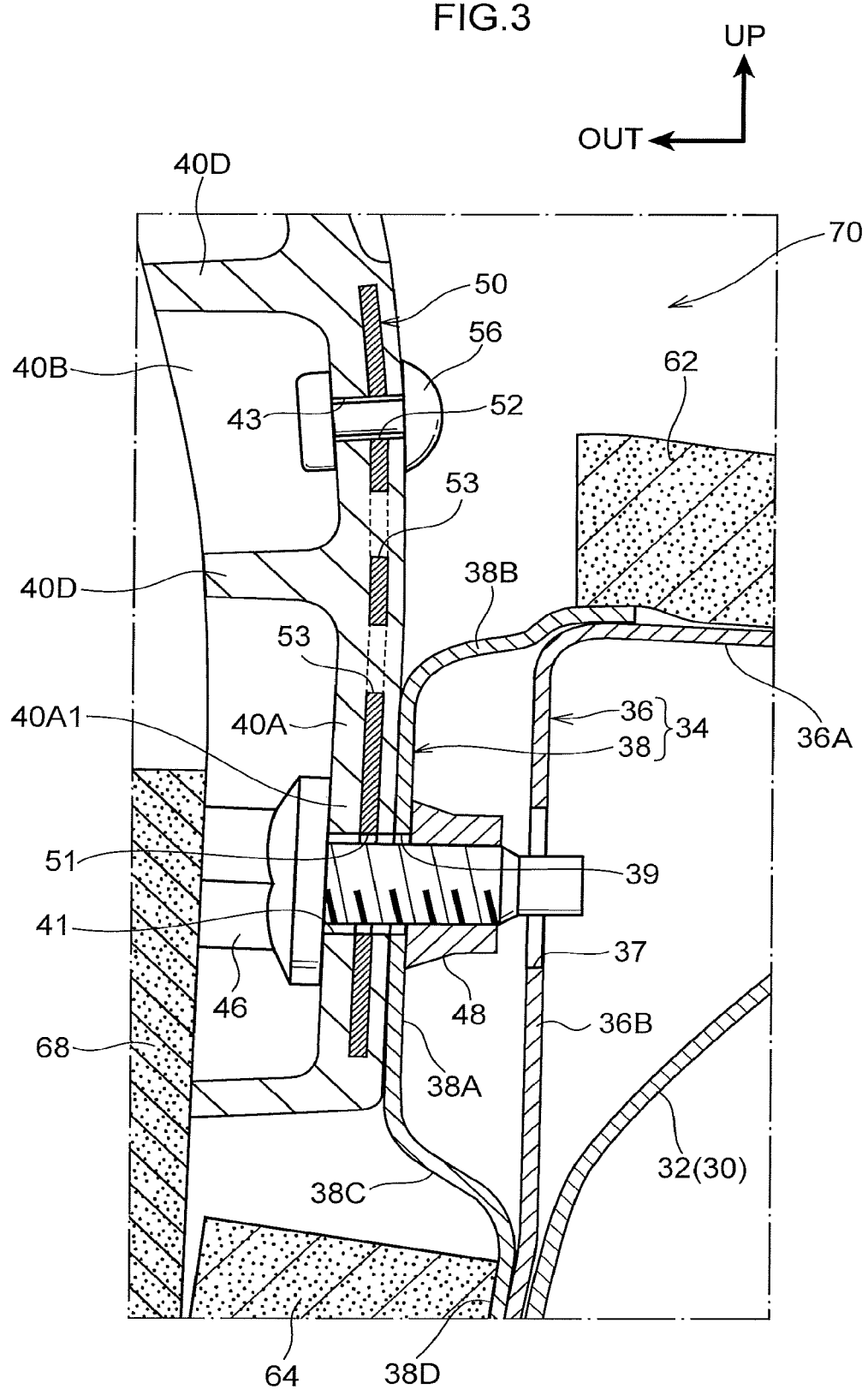
FIG. 3 is a sectional diagram, in which a section corresponding to a portion of FIG. 2 is enlarged, illustrating structures of principal portions of a floor brace fastening structure according to a second exemplary embodiment.

FIG. 3 is a sectional diagram illustrating structures of principal portions of the console side panel 70 in accordance with the second exemplary embodiment. The second exemplary embodiment has basically similar structures to the first exemplary embodiment but differs in the following respects: the reinforcing plate 50 is embedded in the lower end portion of the side wall portion 40A of the floor brace 40; and a pair of upper and lower flow holes 53 are formed in the reinforcing plate 50 and are filled with the material that forms the floor brace 40.

The pair of flow holes 53 correspond to the "penetrating hole" of the present disclosure. The flow holes 53 are formed in, for example, circular shapes as seen in the vehicle width direction. The flow holes 53 are arrayed in the vehicle vertical direction at a vertical direction central portion of the reinforcing plate 50, between the rivet 56 and the bolt 46. The reinforcing plate 50 is embedded in the floor brace 40 by insert-casting. At the time of insert casting, the material of the casting flows into the flow holes 53, forming a structure in which the interiors of the flow holes 53 are filled in with this material. The number of the flow holes 53 is not limited to a pair (two) but may be modified as appropriate.

In this exemplary embodiment, because the reinforcing plate 50 is embedded in the floor brace 40, the reinforcing plate 50 is firmly attached to the floor brace 40. Therefore, the joined state of the floor brace 40 to the vehicle floor 30 via the reinforcing plate 50 is resistant to disengagement at the above-mentioned time of failure of the floor brace 40.

In the present exemplary embodiment, the flow holes 53 formed in the reinforcing plate 50 are filled with the material that forms the floor brace 40. Therefore, the reinforcing plate 50 is attached to the floor brace 40 even more firmly, and the joined state of the floor brace 40 to the vehicle floor 30 via the reinforcing plate 50 is more resistant to disengagement at the above-mentioned time of failure of the floor brace 40. Specifically, when the fastening portion 40A1 of the floor brace 40 fails due to a frontal collision of the vehicle and a large load acts between the floor brace 40 and the reinforcing plate 50, the reinforcing plate 50 is resistant to relative displacement in the vehicle vertical direction with respect to the floor brace 40. Therefore, the reinforcing plate 50 is less likely to detach from the floor brace 40. Thus, the joining strength of the floor brace 40 to the vehicle floor 30 via the reinforcing plate 50 is improved effectively.

In the second exemplary embodiment described above, because the reinforcing plate 50 is firmly attached to the floor brace 40 by the structure described above, the rivet 56 may be omitted.

In the exemplary embodiments described above, cases are described in which the driver seat side floor brace 40 serves as the floor brace of the present disclosure. However, this is not limiting; structures are possible in which the passenger seat side floor brace 60 serves as the floor brace of the present disclosure.

It will be clear that numerous modes may be embodied within a scope that does not depart from the gist of the present disclosure. It will also be clear that the scope of the present disclosure is not to be limited to the exemplary embodiments described above.

What is claimed is:

1. A floor brace fastening structure comprising:
   a floor brace that is configured to extend toward a vehicle lower side from an instrument panel reinforcement provided at a front portion of a passenger compartment;
   a vehicle floor to which the floor brace is fastened using a fastener; and
   a reinforcing member that is formed of a material with a higher coefficient of extension than a material that forms the floor brace, the reinforcing member being attached to the floor brace and being fastened to the vehicle floor using the fastener.

2. The floor brace fastening structure according to claim 1, further comprising another fastener that fastens the floor brace to the reinforcing member at a different location from the fastener.

3. The floor brace fastening structure according to claim 1, wherein the reinforcing member is embedded in the floor brace.

4. The floor brace fastening structure according to claim 3, wherein the reinforcing member includes a penetrating hole, and the penetrating hole is filled with the material that forms the floor brace.

\* \* \* \* \*